United States Patent

[11] 3,601,229

| [72] | Inventor | Norval E. Shurtliff |
| | | 908 1st Place, Springfield, Oreg. 97477 |
| [21] | Appl. No. | 831,415 |
| [22] | Filed | June 9, 1969 |
| [45] | Patented | Aug. 24, 1971 |

[54] HYDRAULIC VIBRATION DAMPER
12 Claims, 5 Drawing Figs.

[52] U.S. Cl.................................................. 188/1 B,
188/311
[51] Int. Cl....................................................... F16f 11/00,
F16f 7/10
[50] Field of Search............................................ 188/1 B,
103, 311; 82/VIB. DIG.

[56] References Cited
UNITED STATES PATENTS
2,195,041  3/1940  Von Schlippe................ 188/1 B X

| 2,591,115 | 4/1952 | Austin.......................... | 188/1 B UX |
| 3,091,307 | 5/1963 | Tiedemann et al. .......... | 188/1 B |

Primary Examiner—Duane A. Reger
Attorney—Eugene D. Farley

ABSTRACT: An hydraulic vibration damper arrests vibration of a boring bar, lathe chuck, or other support. It comprises an inertia member adapted to be mounted on the support for vibration-induced movement. A case is mounted for relative movement on one end of the inertia member with its walls spaced from the walls of the latter. Seal means divide the space between the walls into two chambers. Both chambers are filled with mercury or viscous oil. Upon vibration of the support, the liquid is driven from one side to the other, providing an hydraulic vibration damping effect which supplements the inertia damping effect of the inertia member. In addition, frictional engagement of the end of the inertia member with the case provides a frictional damping effect.

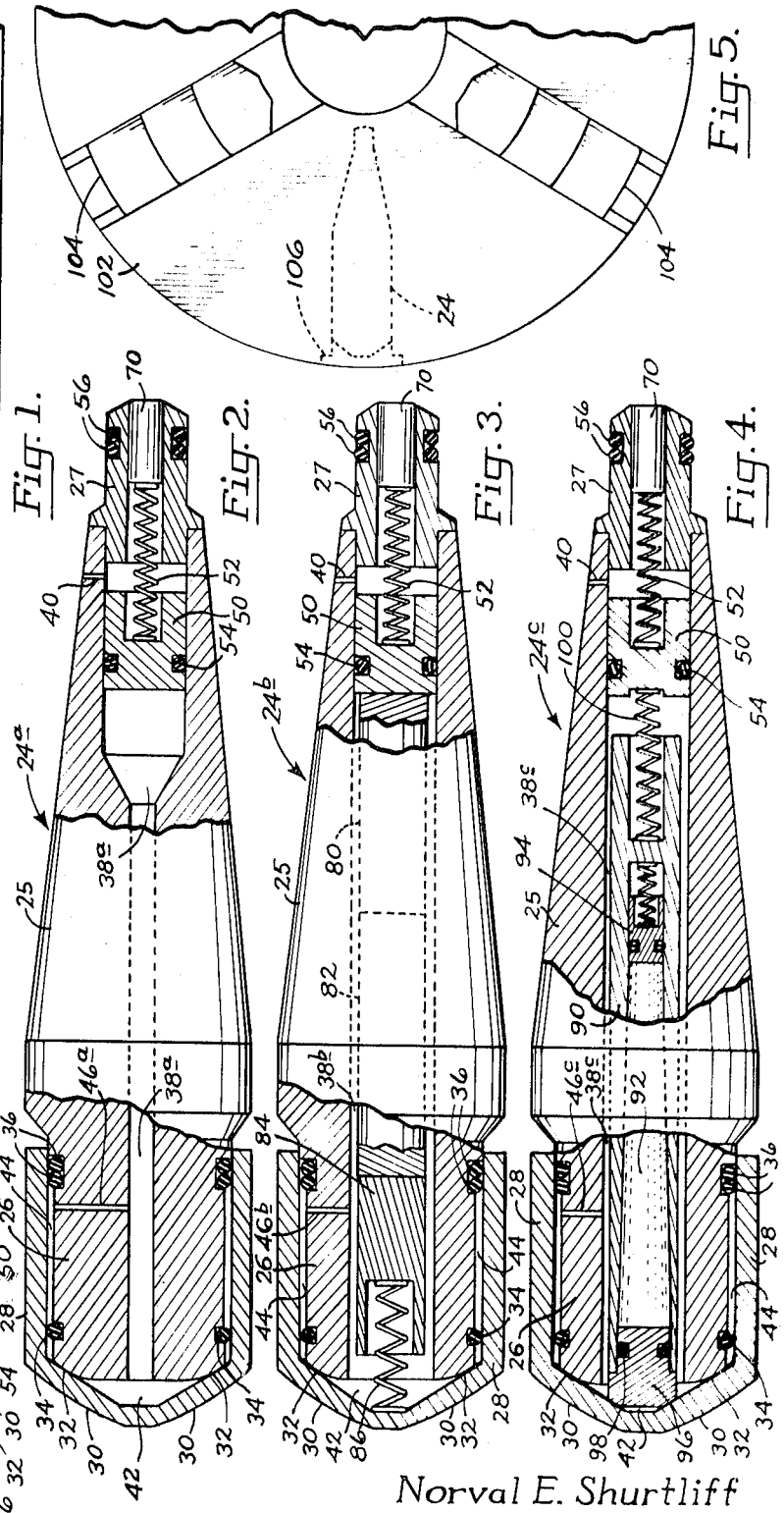

The inner end of bore 38a is enlarged and receives piston 50 in sliding engagement. A roll pin 70 is driven into the inner end of the damper against spring 52 which presses against the piston. After adjustment of the spring to the proper pressure, the end of the pin is cut off.

The action of the damper in FIG. 2 is similar to that of FIG. 1. Spring 52 pushes against piston 50 which keeps under pressure the liquid in chambers 42, 44 and connecting passageway 46a. The liquid pressure acting against the inside of cap 28 lessens the pressure of the damper head against the tapered surfaces of the inside of the cap. This permits the head to slip first in the event of a displacing movement caused by vibration of the tool holder.

Upon displacement of the head, liquid is forced from one side to the other. This exerts an hydraulic damping effect.

The damper is returned to equilibrium not only by spring pressure, but also by the action of seal ring 34 which tends to center the damper head within the case.

Additional damping is accomplished over that exerted by the damper of FIG. 1 in that as the damper is deflected to one side or the other of the case, the damper body must move lengthwise, allowing the liquid to move forward to fill the space thus created. The liquid then moves back as the damper body returns to its equilibrium position, thereby increasing the damping action of the assembly.

The form of the invention illustrated in FIG. 3 displays the same basic vibration damping principles illustrated by the previously described forms of the invention. However, in addition, it is provided with supplemental friction and inertia damping means which increase its sensitivity to a wide spectrum of vibration frequencies.

A in the case of the damper of FIG. 2, that of FIG. 3 has an elongated axial bore 38b which extends the length of the damper body. Communicating with this bore in a passageway 46b which interconnects chambers 42, 44.

Slidably mounted within bore 38b are a plurality of rod segments 80, 82 84. All of these have cross sectional areas which are one sixty-fourth to one thirty-second inch less than the cross-sectional the bore in which they are received. This provides a space which is filled with liquid.

Innermost segment 80 bears against piston 50. Outermost segment 84 is pressed by a spring 86 seated inside case 28. The meeting faces of the segments are squared and in frictional abutting engagement with each other.

The force exerted by spring 86 is less than that exerted by spring 52.

Accordingly, as the damper is displaced laterally by vibrations, and if the liquid is of a lesser density than rod segments 80 82, 84, the mass of the rod segments forces the liquid from one side to the other of bore 38b. The situation is reversed if the liquid is of greater density (mercury). This effect, plus the frictional effect of the rod segment ends frictionally sliding relative to each other, adds to the overall damping effect and increases the sensitivity of the damper to vibrations of various frequencies.

In the damper of FIG. 4, a supplemental damper is included in the assembly.

To this end damper 24c is provided with an axial bore 38c extending its entire length. It communicated with chamber 42 and with chamber 44 via passageway 46c.

The secondary damper indicated at 90 is dimensioned to be received within bore 38c with from one sixty-fourth to one thirty-second inch clearance around its circumference.

The secondary damper is hollow and contains a packing 92 of mercury, mercury mixed with tungsten, or similar damping material. The packing is maintained under pressure by a spring-pressed piston 94. It increases the mass. It also adds unique damping qualities created by agitation of the mercury and tungsten when vibrations are met.

The outer end of the damper is fitted with a head 96 having beveled outer surfaces in frictional engagement with the inside surfaces of cap 28. Seal ring 98 is provided to prevent the escape of damping liquid 92.

The entire supplemental damper assembly is pressed resiliently against the inside of case 28 by means of spring 100, one end of which bears against the supplemental damper and the other against piston 50.

The net effect of the assembly is to provide numerous elements of frictional, inertia, and hydraulic damping which meet the entire range of vibration frequencies. Vibrations thus are effectively damped over a wide range, for light to heavy.

The form of the invention illustrated in FIG. 5 is of interest in that it depicts the application of the damper of the invention to a lathe chuck. A similar application might be made to a large milling cutter.

The lathe chuck, which otherwise may be conventional in its construction, comprises a large circular body 102 having radially extending tool holders 104. The chuck body is modified by the provision of one or more radially extending recesses 106. These are dimensioned to receive any one of the vibration dampers of the invention, for example, that indicated at 24 in FIG. 1. When thus in place within the lathe chuck body, the damper effectively overcomes vibrations set up during operation of the lathe.

Having thus described my invention in preferred embodiments, I claim as new and desire to protect by Letters Patent:

1. For use in arresting the vibration of a vibrating support, an hydraulic damper comprising:
   a. an inertia member adapted to be mounted on the support for vibration-induced movement,
   b. a case mounted on the inertia member with its walls spaced from the walls of the inertia member,
   c. the case and the inertia member being relatively movable transversely and longitudinally with respect to each other, and
   d. seal means sealing the space between the case and the inertia member and forming a chamber,
   e. the chamber being filled with liquid,
   f. the liquid upon relative movement of the case and the inertia member being driven from one side of the chamber to the other, thereby exerting an hydraulic damping effect upon the support.

2. For use in arresting the vibration of a vibrating support, an hydraulic damper comprising:
   a. an inertia member adapted to be mounted on the support for vibration-induced movement,
   b. cap mounted on an end of the inertia member for transverse and longitudinal movement with its walls spaced from the walls of the inertia member,
   c. means for pressing the inertia member against the inner surface of the cap, forming a first chamber,
   d. seal means interposed between the sidewalls of the inertia member and the cap and defining a second chamber,
   e. the chambers being filled with liquid,
   f. the liquid upon relative movement of the case and the inertia member being driven from one side of the chambers to the other by relative movement of the case and the inertia member.

3. The damper of claim 2 including piston means mounted within the inertia member and exerting predetermined pressure on the liquid in the first chamber.

4. The damper of claim 2 wherein the outer end of the inertia member and the inner surface of the cap are tapered to provide bearing surfaces having a friction damping action and including spring-pressed means mounted in the inertia member and bearing against the liquid in the first chamber, the spring pressure being predetermined to adjust the frictional engagement of the inertia member and cap to a predetermined level.

5. The damper of claim 4 wherein the inertia member comprises an elongated body having a central axial bore communicating with the first chamber at its forward end and at its rearward end being enlarged to mount the spring-pressed piston means.

6. The damper of claim 2 wherein the inertia member is provided with an axial bore, communicating with one of the

HYDRAULIC VIBRATION DAMPER

This invention relates to damping devices for use in controlling the vibration of a vibrating support. It pertains particularly to boring bars and other holders for tools employed in milling, boring and grinding machines; turret and engine latches; and other equipment in which cutting or other tools and the work are rotated relative to each other.

Although vibration dampers of many types heretofore have been devised there still is needed one universally applicable to various types of vibrating supports, which is efficient in damping vibrations over a wide range of frequencies.

In accordingly is the general purpose of the present invention to provide a vibration damper which is highly efficient, of high capacity, widely applicable, and effective in damping vibrations having a wide range of frequencies.

A further important object of the present invention is the provision of a vibration damping device which effectively combines in one unit the principles of hydraulic, friction, and inertia damping.

Another object of the present invention is the provision of a vibration damping device which is simple in construction, easily manufactured and serviced, and which possesses a long service life.

In the drawings:

FIGS. 1, 2, 3 and 4 are views partly in longitudinal section of the presently described vibration damper in four different embodiments, FIG. 1 illustrating the application of the damper to a boring bar; and FIG. 5 is a fragmentary view in plan illustrating a lathe chuck embodying the herein described vibration damper.

In the FIG. 1 form of the invention, the vibration damper is mounted in an elongated, hollow support bar 10. The bar has a central, longitudinally extending bore 12 which preferably is inwardly tapered.

The outer end of bore 12, i.e. that adjacent the tool holder is provided with a cap 14 secured across the bore of the bar by welding or other suitable means, The inner surface of cap 14 has a tapered end wall formed by abutment surfaces 16. These are outwardly divergent from the longitudinal axis of the bar at a suitable angle.

Cap 14 is provided with screw means 18 for mounting a selected cutting tool, not illustrated.

The shank end of the bar 10 has an internally threaded segment 20. The bore 12 of the bar receives the herein described stabilizing or damping device, indicated generally at 24, the function of which is to damp any vibrational movement which may be induced in the holder during the cutting operation.

Rod 24 is dimensioned so that when it is centered in bore 12 it is spaced laterally from the side walls of the bore by a distance of, for example one sixty-fourth inch to one-fourth inch, preferably one thirty-second inch. Also, the rod is somewhat shorter than the longitudinal dimension of the bore. It thus is possible for the rod to move both laterally and longitudinally with respect to the bar in which it is housed.

Although the exterior configuration of rod 24 may be varied, in the FIG. 1 form of the invention the rod is tapered inwardly to conform to the inwardly tapered configuration of bore 12 in support bar 10.

The vibration damper 24 consists basically of two parts: a body 25 having a head 26 and a shank 27, both of restricted cross section with respect to the body; and a case or cap 28.

Case 28 is mounted for relative sliding and transverse movement over head 25. Its outer or reach end is formed with bevelled surfaces which may match, or be inwardly divergent from, bevelled surfaces 16 of boring bar cap 14. The side walls of the case are spaced not only from the inner walls of boring bar 10, but also from the outer walls of head 25.

The latter element of the assembly has outwardly divergent end walls 32, the taper of which matches, or preferably is slightly divergent from, the taper of the inner end walls of case 28. These two walls are designed to bear against each other.

The sidewall of head 25 is spaced laterally from the inner sidewall of case 28 by a clearance of the order of 0.005 to 0.010 inch. It is provided with seals 34, 36 spaced longitudinally from each other. Seal 34 serves the additional functions of cushioning head 26 and case 28 so that they do not strike against each other, and so that they quickly return to their central equilibrium position after each displacement.

Head 25 further is provided with an axial bore 38 which communicates at one end with the space immediately behind the front walls of case 28, and at the other end with an air-pressure-equalizing passageway 40.

There thus are provided two chambers. A front chamber 42 is created by the seal existing between the forward end of head 25 and the inner wall of case 28. A second chamber 44 is created by spaced seals 34, 36. These two chambers are interconnected by a passageway 46 which underlies seal 34.

Chambers 42, 44 and connecting passageway 46 are filled with a liquid which is capable of exerting an hydraulic damping effect. Such a liquid, for example, comprises a viscous oil, or mercury.

A continuous pressure is exerted upon the liquid contained within the chamber and passageway.

Such pressure may be exerted by means of a piston 50 dimensioned for sliding engagement within bore 38. It is spring pressed by spring 52. Its forward end is sealed by seal ring 54.

Shank end 27 of the vibration damper is received in the inner portion of boring bar bore 12. It mounts one or more seal rings 56.

The entire vibration damper assembly as described above is pressed forwardly by means of a spring 58 which bears against a slidably mounted block 60. The force exerted by spring 58 is adjusted by means of a screw 62 received in threaded segment 20 of the tool holder bore, behind the spring.

In the operation of the device above described, a plurality of damping forces is brought to bare in overcoming the tendency to vibrate of boring bar 10.

First, the entire vibration damper 24 tends to be displaced laterally. This tendency is resisted not only by the inertia of the damper, but also by the frictional forces present between the forward end of the damper and the inner surface of boring bar cap 14.

Secondly, a vibration damper body 26 tends to be displaced laterally by vibration of the boring bar. This tendency is resisted not only by the inertia of the damper, but also by the frictional forces developed at the interface between the outer end of head 25 and the inner surface of case 28.

It further is resisted by the hydraulic damping effect of the fluid contained within chambers 42, 44 and connecting passageway 46 as it is pumped by lateral displacement of the damper body from one side to the other of the chamber 44. Additional hydraulic damping is contributed by movement of fluid back and forth ahead of piston 50.

Furthermore, the various damping factors are susceptible to vibrations of varying magnitude. Heavy vibrations are required to displace the entire vibration damping assembly 24. Vibrations of smaller magnitude will displace head 25.

The magnitude of this differential is determined in part by the force exerted by spring-pressed piston 50. The greater the force, the greater the tendency to separate head 25 from the inner face of case 28, making it more easily displaced laterally and hence more sensitive to vibration.

The result is the provision of a tool holder assembly which is tuned to the entire spectrum of vibrations so that the tool holder may be used over a wide range of speeds, including extremely high speeds, without incurring chatter and its related problems.

The damper 24a of FIG. 2 is similar in its construction to that of FIG. 1. However, it is provided with an axial bore 38a which extends the length of the damper body and communicates with chamber 42. Passageway 46a interconnects the bore and chamber 44.

chambers, spring pressed piston means mounted in the bore, and a rod divided transversely into segments having a cross-sectional area less than the cross-sectional ares of the bore mounted within the bore in bearing engagement with the piston means.

7. The damper of claim 2 wherein the inertia member is provided with an axial bore communicating with the first chamber, spring-pressed piston means mounted in the bore, a rod divided transversely into segments having a cross-sectional area less than the cross-sectional area of the bore mounted within the bore in bearing engagement with the piston means, the outermost of the segments being spring pressed in a direction opposing the force of the piston means for retaining the segments in frictional abutting relationship to each other, the force exerted by the spring being less than that exerted by the piston means.

8. The damper of claim 2 wherein the inertia member is provided with an axial bore communicating with the first chamber, piston means mounted in the inner end of the bore, a second inertia member mounted in the forward part of the bore, the rearward end of the second inertia member engaging the piston means and the forward end being in frictional engagement with the inner surface of the cap, the second inertia member having a cross-sectional area less than the cross-sectional area of the bore.

9. The damper of claim 8 wherein the second inertia member comprises a hollow case filled with a damping liquid.

10. The damper of claim 2 wherein the liquid comprises a viscous oil.

11. The damper of claim 2 wherein the liquid comprises mercury.

12. The damper of claim 2 including a passageway interconnecting the two chambers from pressure equalization.